April 10, 1956  D. J. BROWN ET AL  2,741,326
GREASE DEAERATING MECHANISM
Filed May 25, 1953  2 Sheets-Sheet 1
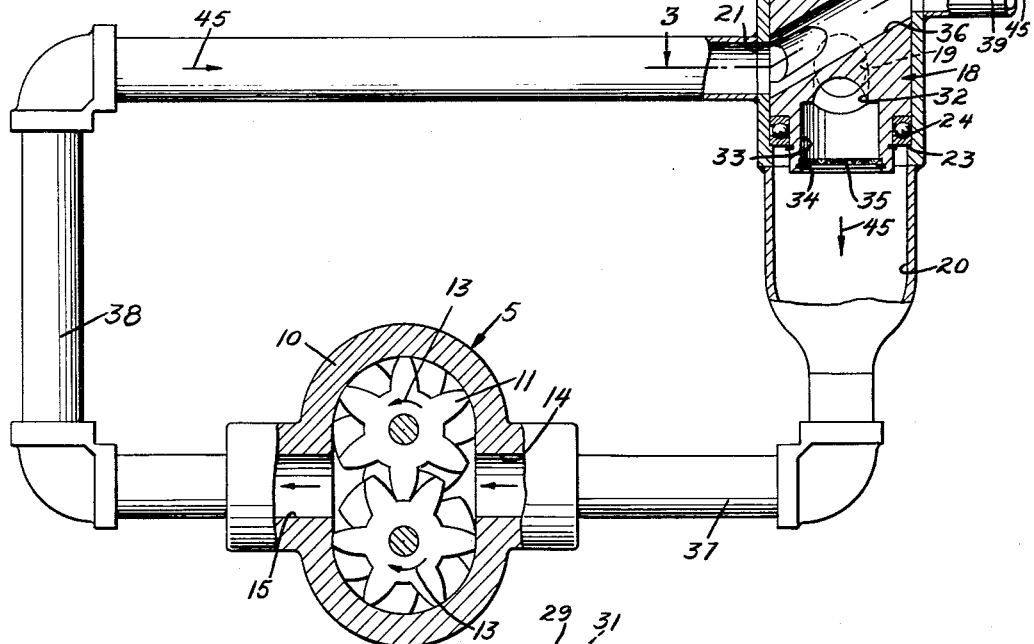
Fig. 1.
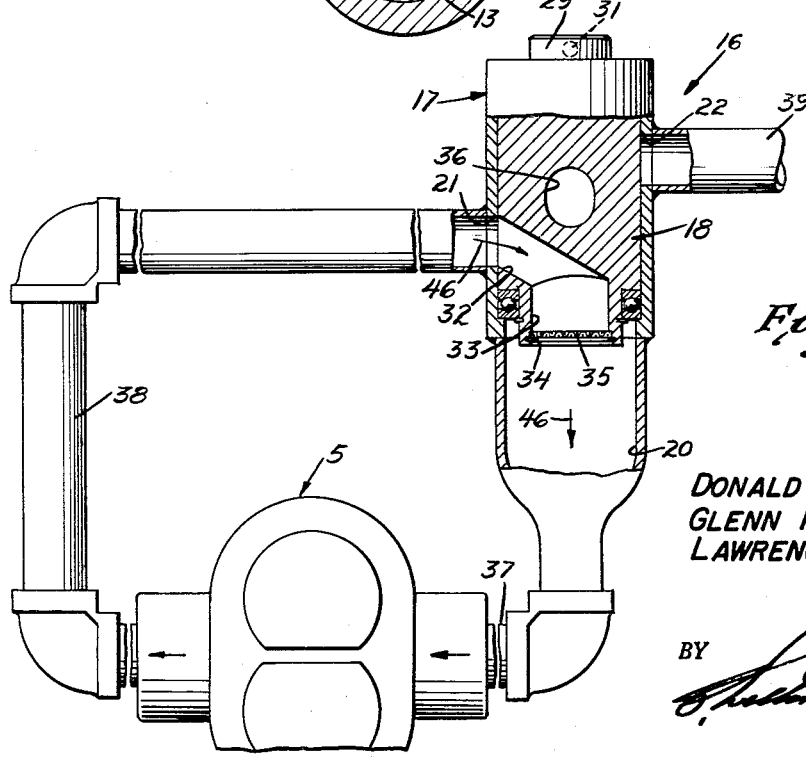
Fig. 4.
DONALD J. BROWN
GLENN H. MOREHOUSE
LAWRENCE B. SCHAUER
INVENTORS.
BY 
ATTORNEY April 10, 1956 D. J. BROWN ET AL 2,741,326
GREASE DEAERATING MECHANISM
Filed May 25, 1953 2 Sheets-Sheet 2
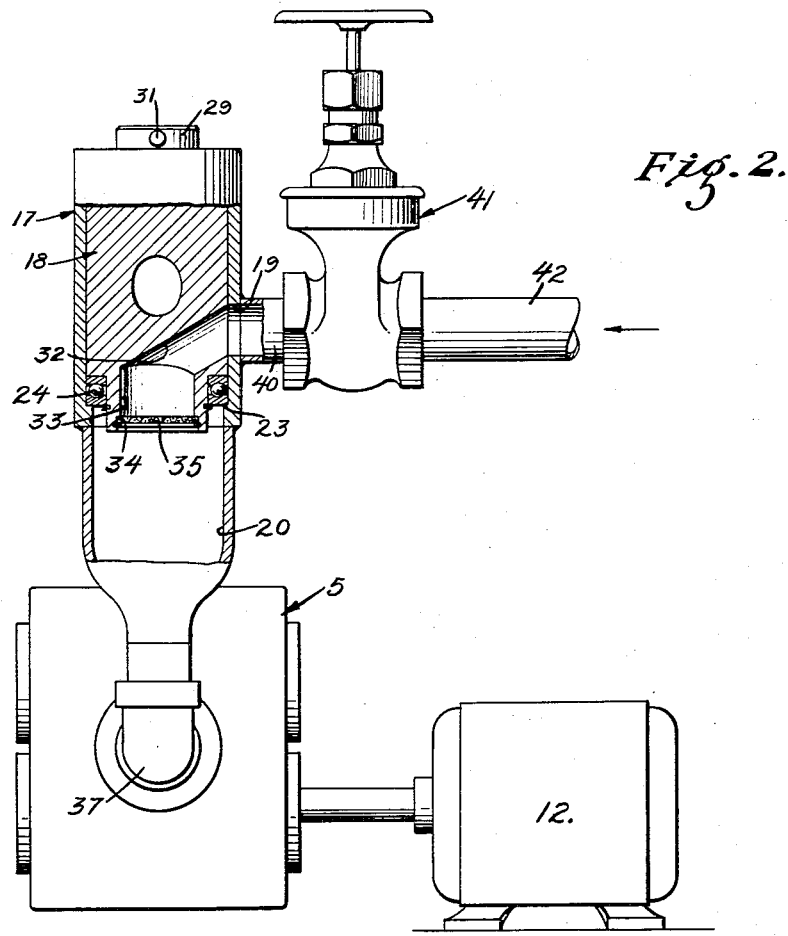
Fig. 2.
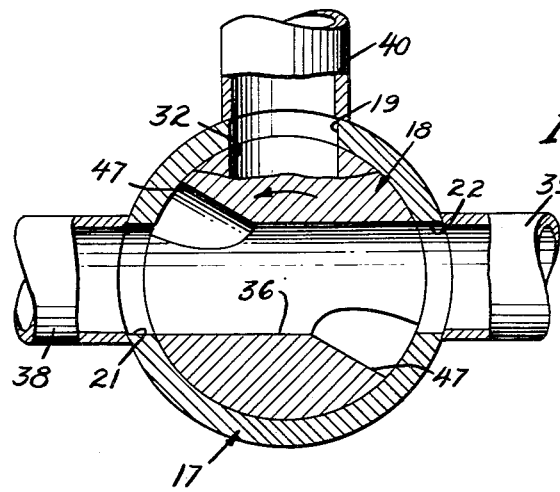
Fig. 3.
DONALD J. BROWN
GLENN H. MOREHOUSE
LAWRENCE B. SCHAUER
INVENTORS.
BY 
ATTORNEY United States Patent Office 2,741,326
Patented Apr. 10, 1956

2,741,326

GREASE DEAERATING MECHANISM

Donald J. Brown and Glenn H. Morehouse, Los Angeles, and Lawrence B. Schauer, Pasadena, Calif., assignors to Morehouse Industries, Los Angeles, Calif., a partnership consisting of Leland P. Smoot and Glenn H. Morehouse Application May 25, 1953, Serial No. 357,204

3 Claims. (Cl. 183—2.5)

Our invention relates to a grease deaerating system which utilizes the invention disclosed in, and constitutes an improvement on the grease milling apparatus disclosed in the copending application of Glenn H. Morehouse, Serial No. 163,758, filed May 23, 1950, now Patent No. 2,660,259, issued November 24, 1953.

Herein the term "grease" is used in a broad sense to indicate substances of the general character of grease in which air bubbles may be trapped. For example, in the preparation of lubricant materials, referred to as greases, mills are employed in the mixing and working of the materials which enter into the finished product. During the mixing and milling process air is entrained in the product so that the volume of the mass, consisting of air and unctuous materials is considerably increased. For example, the volume of grease with entrained air may be substantially doubled as compared to the volume of the grease when the air has been removed therefrom by the device disclosed herein.

The present invention uses a rotary pump employing herringbone gears as disclosed in the Morehouse patent identified in the foregoing. The apparatus incorporates means whereby a quantity of grease may be continuously circulated through the pump, or by the operation of a control handle, the deaerated grease discharged from the pump may be delivered to outlet or discharge piping arranged to be connected to containers for receiving the deaerated grease.

It is an object of the invention to provide a grease milling apparatus employing a suction pump in accordance with the teachings of said Morehouse patent, and having ducts and a valve means adapted to be adjusted between first and second positions, the valve means being arranged so that when it is adjusted to its first position, the grease to be deaerated will be taken in from a source of such grease, moved by suction through a reticulated member and then through the rotary pump so as to release the air from the small bubbles which are formed in the grease, the deaerated grease, and separated air, being then delivered from the outlet of the pump to a suitable grease receiving means such, for example, as a drum. When the valve means is adjusted to the second position, it will connect the inlet and the outlet of the pump so that grease discharged from the outlet of the pump will be returned to the inlet. Therefore, the grease may be continuously recirculated, without the necessity of shutting down the deaerating device, during the time a filled container is being replaced by a container which is to be filled.

A further object of the invention is to provide in the device a valve having a valve body made in accordance with the preceding paragraph, this valve body being removable from its operative position and having in its inlet passage a means for breaking up the flow of grease which is moving under suction and partial vacuum toward the inlet of the rotary pump.

A further object of the invention is to provide a novel selector valve which cooperated with duct forming members of the device to accomplish the results contributable to the invention.

Further objects and advantages of the invention may be brought out in the following part of the specification wherein, for the purpose of disclosing the invention, we have described details of a preferred embodiment of the invention, without limiting the scope of the invention defined in the accompanying claims.

Referring to the drawings which are for illustrative purposes only:

Fig. 1 is a schematic sectional view showing a preferred embodiment of our invention;

Fig. 2 is a side view of the device shown in Fig. 1;

Fig. 3 is a sectional taken as indicated by the line 3—3 of Fig. 1;

Fig. 4 is a diagrammatic view corresponding to Fig. 1, but showing the valve means of the device in its second position.

As shown in Fig. 1, the grease deaerating device comprising our invention has a rotary gear pump 5, including a casing 10 having therein a pair of meshed herringbone gears 11 arranged to be driven by a motor 12 in the direction indicated by the arrows 13. The rotation of the gears 11 in the directions 13 will cause flow of fluid or other pumpable material from the pump inlet 14 to the pump outlet 15.

A part of the invention consists of a valve device 16 having a cylindrical casing 17 in which a rotatable valve body 18 is operative. The casing 17 has four ports which, for the purpose of simplifying the description will be identified as follows. In the side wall of the casing there is a first inlet port 19 which cooperates with a first outlet port 20 disposed at the lower end of the casing 17. As shown in Figs. 1 and 3, a second inlet port 21 is formed in the side wall of the casing 17, substantially horizontally aligned with the first inlet port 19 and at an angle of substantially 90° therefrom. In the side wall of the casing 17 there is also a second outlet port 22, in substantially the same vertical plane as the second inlet port 21 but at a higher level as shown in Fig. 1.

In a horizontal plane below the inlet ports 19 and 21 the casing 17 has an upwardly faced annular shoulder 23 to support the lower race of a thrust bearing 24, and adjacent the upper end of the casing 17 there is an internal groove 25 arranged to receive a snap ring 26 which limits upward movement of a retaining ring 27 which carries therein a sealing ring 28 for engagement with the casing 17.

The valve body 18 is of generally cylindrical form and is supported on the bearing 24. A similar bearing 24a is placed between the upper portion of the body 18 and the retaining ring 27, to limit upward movement of the body 18. The body 18 has a hub 29 which projects upwardly through the retaining ring 27 and is equipped with a radially extended threaded opening 30 into which an operating handle 31 is screwed.

As best shown in Fig. 2, the valve body 18 has therein a first passage 32 enlarged at its lower end so as to provide a cylindrical cavity 33 in the lower end of the valve body 18. The first passage 32 extends diagonally to the side wall of the valve body 18 so that its upper portion will communicate with the first inlet port 19, when the valve body is in the first position thereof, shown in Figs. 1, 2 and 3. The cavity 33, forming the lower end of the passage 32 has a counterbore 34 arranged to receive a screen or reticulated member 35 in a position crossing the mouth of the passage 32.

A second passage 36 is formed in the body 18 in a vertical plane disposed substantially perpendicular to the vertical plane defined by the passage 32, this passage 36 sloping so as to connect the second inlet port 21 of the casing 17 with the second outlet port 22, when the valve body is in its first position.

As shown in Fig. 1, the first outlet port 20 is connected by piping 37 with the inlet 14 of the pump 5. The outlet of the pump 5 is connected by piping 38 with the second inlet port 21 of the valve device 16. A discharge pipe 39 for the deaerated grease is connected to the second outlet port 22. As shown in Figs. 2 and 3, piping 40 is conected to the first inlet port 19. As shown in Fig. 2 this pipe 40 extends to a vacuum control valve 41. The valve 41 is in turn arranged to be connected by a pipe 42 with a source of grease to be deaerated, such as the discharge hopper 21 of a grease mill. When the valve body 18 is rotated in counterclockwise direction 90° from the position in which it is shown in Fig. 1 to the position in which it is shown in Fig. 4, the passage 36 will be disconnected from the ports 21 and 22 and the upper end of the passage 32 will be positioned so as to communicate with the second inlet port 21.

The operation of the pump 5 creates a suction in the inlet 14 thereof and in the parts connected therewith. When the valve body 18 is in the position thereof shown in Fig. 1, the grease to be deaerated is drawn in through the valve 41 which is adjusted so as to restrict the inward flow of grease and thereby create a partial vacuum, close to complete vacuum in that part of the system between the inlet chamber of the pump 5 and the valve 41. The grease is caused to move through the system as indicated by the arrows 45. It passes through the pump, the piping 38 and the second passage 36 of the valve body 18 to the discharge port 22. Due to the partial vacuum or strong suction applied to the grease as it leaves the valve 41, the larger bubbles of the air or gas therein are caused to expand and burst. The grease, with expanded smaller or microscopic bubbles of air therein passes through the openings of the screen member 35 which acts to break up or divide the flow of grease into a large number of small streams and thereby release the air from the microscopic bubbles. The relatively small bubbles of air separated from the grease are integrated to form relatively large bodies of air which pass through the system along with the grease, but not intermixed therein.

When the valve body 18 is moved into its second position shown in Fig. 4 the inlet 14 and the outlet 15 of the pump will be connected owing to the connection of the second inlet port 21 with first outlet port 20 of the casing 17, the result being that a closed circuit will be formed as indicated by arrows 46, and the grease which is discharged through the outlet 15 of the pump will be continuously returned to the inlet 14 thereof. So as to prevent locking of the pump during movement of the valve body 18 between its first and second positions, the passage 36 is provided with laterally enlarged ends 47. Referring to Fig. 3, as the valve body 18 is rotated in counterclockwise direction from the position in which it is shown, the upper end of the passage 32 will move leftwardly from its position of communication with the port 19 to a position of communication with the port 21. However, communication between the ports 21 and 22, through the passage 36, will not be broken until the upper end of the passage 32 has partially overlapped the port 21. This arrangement assures that at no time will the outlet of the pump 5 be blocked off so as to stop the rotation of the pump or burst a part of the system between the outlet chamber of the pump and the port 21 of the valve device 16.

We claim:

1. In a deaerating system comprising a rotary suction pump having an inlet and an outlet and means for restricting the flow of material toward the inlet of said pump so that it will be subjected to partial vacuum: a valve casing arranged between said pump inlet and said flow restricting means and having a first inlet port connected to said flow restricting means, a first outlet port connected to the inlet of said suction pump, a second inlet port connected to the outlet of said suction pump, and a second outlet port for connection to means which is to receive deaerated material; and a valve body in said casing operable from a first position to a second position, said valve body having a first passage arranged, when it is in said first position, to connect said first inlet port with said first outlet port and a second passage connecting said second inlet port with said second outlet port, so that the action of said pump will be to move the material to be deaerated in through said flow restricting means and said first inlet port and deliver the deaerated material through said second outlet port, and when said valve body is in said second position said first passage will connect said second inlet port with said first outlet port, so that the inlet and outlet of said suction pump will be connected and material then delivered from the outlet of the pump will be returned to the inlet thereof, and means in said first passage providing a plurality of small openings for breaking up the flow of said material so as to effectively release gas forming small bubbles therein.

2. In a deaerating system comprising a rotary suction pump having an inlet and an outlet and means for restricting the flow of material toward the inlet of said pump so that it will be subjected to partial vacuum: a valve casing arranged between said pump inlet and said flow restricting means and having a first inlet port connected to said flow restricting means, a first outlet port connected to the inlet of said suction pump, a second inlet port connected to the outlet of said suction pump, and a second outlet port for connection to means which is to receive deaerated material; a valve body removably disposed in said casing operable from a first position to a second position, said valve body having a first passage arranged, when it is in said first position, to connect said first inlet port with said first outlet port and a second passage connecting said second inlet port with said second outlet port, so that the action of said pump will be to move the material to be deaerated in through said flow restricting means and said first inlet port and deliver the deaerated material through said second outlet port, and when said valve body is in said second position said first passage will connect said second inlet port with said first outlet port, so that the inlet and outlet of said suction pump will be connected and material then delivered from the outlet of the pump will be returned to the inlet thereof; and screen means within the casing in the path of flow from said first inlet port to said second outlet port, said screen means being arranged so that it is exposed for replacement or cleaning when said valve body is removed from said valve casing.

3. A system as defined in claim 2 wherein said screen means is removably secured in said first passage of said valve body so as to be removed through an end of said first passage.

References Cited in the file of this patent

UNITED STATES PATENTS

| 2,526,923 | Alessandro | Oct. 24, 1950 |
| 2,660,259 | Morehouse | Nov. 24, 1953 |

FOREIGN PATENTS

| 113,417 | Australia | July 17, 1941 |